United States Patent Office 3,285,475
Patented Nov. 15, 1966

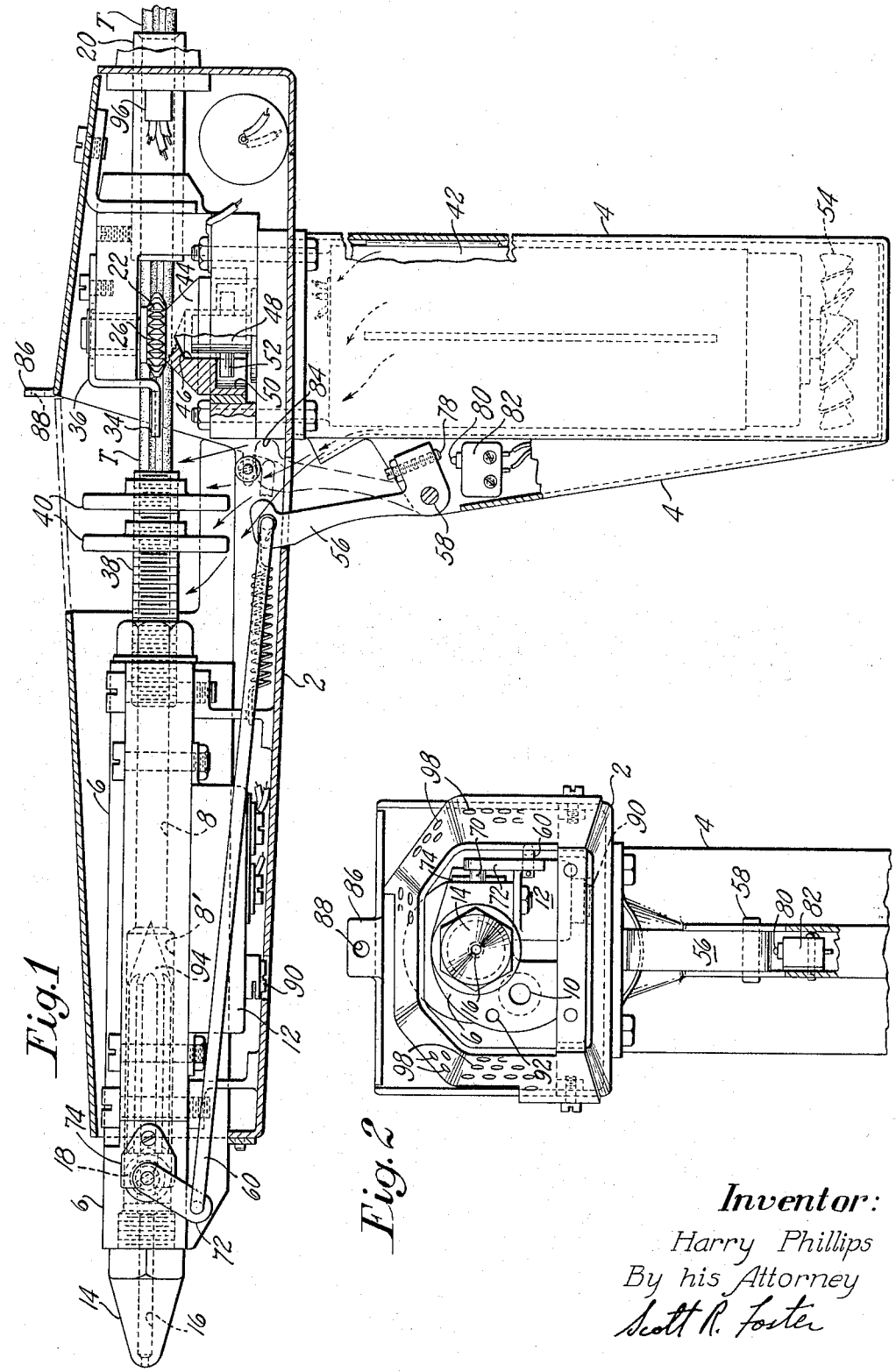
Nov. 15, 1966    H. PHILLIPS    3,285,475
CEMENT EXTRUDERS
Filed Feb. 8, 1965    2 Sheets-Sheet 1
Inventor:
Harry Phillips
By his Attorney
Scott R. Foster Nov. 15, 1966
H. PHILLIPS
3,285,475
CEMENT EXTRUDERS
Filed Feb. 8, 1965
2 Sheets-Sheet 2
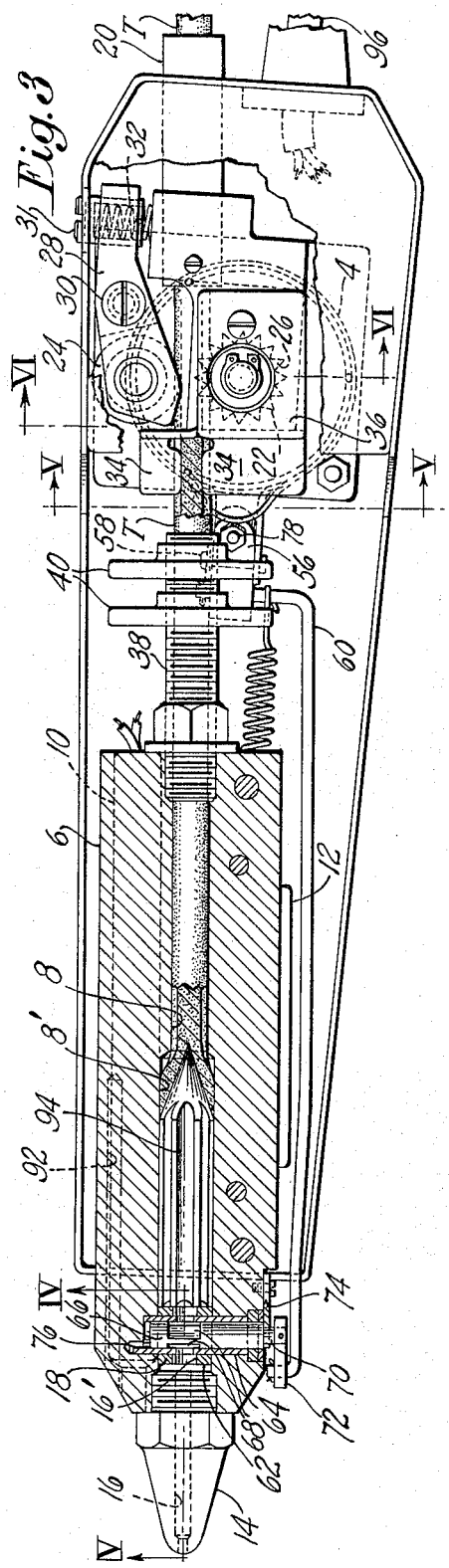
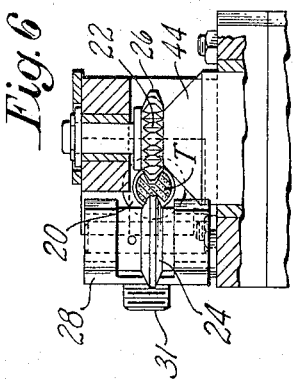
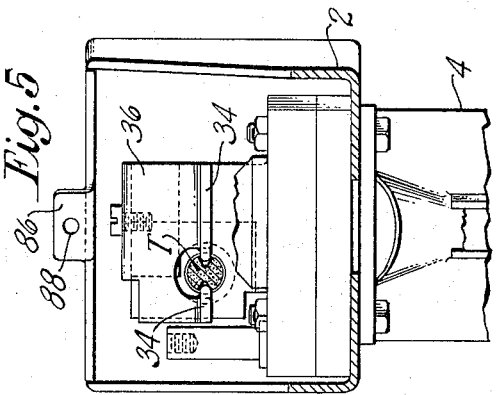
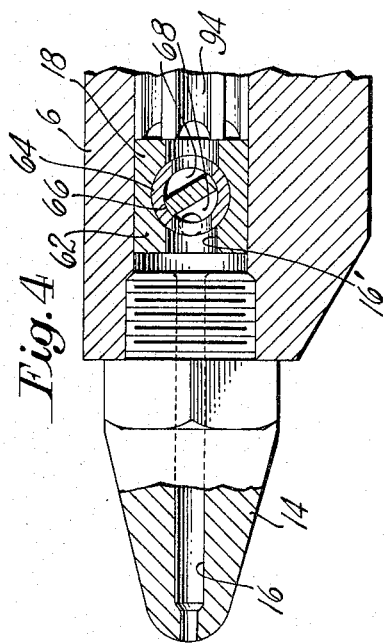

3,285,475
CEMENT EXTRUDERS
Harry Phillips, Hamilton, Mass., assignor to United Shoe Machinery Corporation, Boston, Mass., a corporation of New Jersey
Filed Feb. 8, 1965, Ser. No. 430,874
4 Claims. (Cl. 222—146)

This invention relates to cement extruders and is directed more particularly to an improved hand-held device for dispensing thermoplastic adhesive.

Thermoplastic cements have proved to be well suited for a wide variety of applications and are particularly useful in applications where small quantities of quick setting adhesive are required, such as in closing of cartons, in certain shoemaking operations, or in furniture repairing. For this purpose a number of thermoplastic cement applying devices have been developed. Tools for the application of thermoplastic cements often have a heatable barrel portion aligned with a passage in the frame of the tool. It is desirable that the tools be so constructed that the temperature of a thermoplastic material disposed in the passage in the frame of the tool be maintained below the melting point of the thermoplastic, while the temperature of the barrel portion is raised to a point sufficient to insure the melting of the thermoplastic disposed in that portion. A feed means is usually provided for urging the thermoplastic material through the passage in the frame to the heatable barrel portion, causing the melted material to be extruded from the barrel.

Small hand-held cement extruders have been developed for both consumer and industrial use. In many instances, in order to maintain the tools light and inexpensive, they are not provided with any self-contained power means for feeding the thermoplastic rod to the heatable barrel portion, but instead, are fed by pressure from an operator's hand. Where power feed means have been provided in the tool itself, the tool has been bulky and not easily handled.

Accordingly, it is one object of the invention to provide a lightweight and inexpensive portable melting and dispensing tool having its own power feed means.

Another problem sometimes encountered in the small thermoplastic hand guns is the premature melting of the thermoplastic rod prior to its entrance into the barrel portion of the tool. This is usually caused by heat radiating from the barrel portion or conducted along the barrel to the barrel entrance. Melting of the rod prior to entering the barrel can cause drippage at the barrel entrance and a possible clogging of the tool. To counteract this, many portable dispensers have incorporated cooling fins or air gaps for insuring that the thermoplastic rod maintains its solid state before entering the barrel. While these steps have remedied the situation to some extent, it has been found desirable to provide a greater dissipation of heat than is afforded by these steps alone. It is, therefore, another object of this invention to provide for forced draft cooling means contained in the unit. It is a further object to provide such a cooling means which does not add substantially to the size or weight of the device.

Another problem in the devices of this type has been the "drool" or drippage of the melted thermoplastic from the barrel when the extruder is not being used, as when the device is laid aside between periods of use. To minimize drool, in accordance with a feature of the invention, the discharge nozzle is provided with a valve which opens when the tool is being used and closes when cement is no longer desired, thereby positively shutting off the flow of molten cement through the nozzle.

The above and other features of the invention, including various novel details of construction and combinations of parts, will now be more particularly described with reference to the accompanying drawings and pointed out in the claims. It will be understood that the particular machine embodying the invention is shown by way of illustration only and not as a limitation of the invention. The principles and features of this invention may be employed in numerous and varied embodiments without departing from the scope of the invention.

In the drawings:
FIG. 1 is an elevational view of one form of extruder embodying the invention with the left side cover removed and some parts shown in section for greater clarity;
FIG. 2 is a front elevational view;
FIG. 3 is a plan view with the top cover removed and some parts shown in section;
FIG. 4 is a sectional view of a portion of the device taken along line IV—IV of FIG. 3;
FIG. 5 is a sectional view of another portion of the device taken along line V—V of FIG. 3; and
FIG. 6 is a sectional view of still another portion of the device taken along line VI—VI of FIG. 3.

Referring to the drawings, it may be seen that the preferred embodiment of the present invention comprises a frame 2 having a grip portion 4. On the frame 2 there is mounted a barrel assembly 6 which includes a barrel 8 in which thermoplastic rod T is transformed from a solid to a liquid state, a heating element 10, which affords the heat necessary to melt the thermoplastic rod, and a thermostat 12 which controls the level of heat in the barrel 8. At one end of the barrel 8 there is disposed a nozzle 14 having a channel 16 through which molten plastic is extruded. A valve 18 is located near the nozzle 14 and is arranged to selectively shut off or permit passage of plastic from the barrel 8 through the channel 16, as will be further described below.

In the frame 2 there is mounted a feed tube 20 for the admittance of the solid thermoplastic rod T. A drive feed wheel 22 and an idling feed wheel 24 are mounted in the frame and cooperate to hold the thermoplastic rod T between them and, upon operation of the driving wheel, to feed the rod T toward the barrel. The drive feed wheel 22 has formed about its periphery a continuous set of teeth 26 for engaging the rod T. As may be seen in FIGS. 3 and 6, the idling feed wheel 24 is journaled on the bifurcated end of a lever 28 which pivots about a pin 30. The other end of the lever 28 is urged outwardly from the centerline of the device by a coil spring 32 which thereby urges the idling wheel 24 into firm but yielding engagement with the thermoplastic rod T. The spring pressure exerted on the lever 28 may be increased or diminished by turning of an adjusting screw 31 (FIG. 3).

The invention contemplates the use of thermoplastic material in solid rod form of the type disclosed in U.S. Letters Patent No. 2,874,084, granted February 17, 1959. Such rod form has an indentation of a generally V configuration on opposite sides of the rod, as may be seen in FIGS. 5 and 6. The teeth 26 of the drive feed wheel 22 are shaped to engage one of the V portions of the thermoplastic material. The periphery of the idling feed wheel 22 is shaped to engage the other V portion of the thermoplastic material. In addition, guide vane portions 34 of a guide plate 36 fixed to the frame engage the V portions of the rod T, for supporting the material in its approach to the barrel. The feed tube 20, the feed wheels 22, 24, and the guide plate 36 form a passageway in the frame for the thermoplastic rod.

A threaded entrance tube 38 is located at the entrance of the barrel 8 and protrudes rearwardly therefrom (to the right as viewed in FIGS. 1 and 3) to a point just forward of the guide vanes 34. The entrance tube receives the thermoplastic rod T upon its moving forward from the guide vanes. Cooling discs 40 may be screwed onto the entrance tube 38 as desired, FIGS. 1 and 2 showing two cooling discs mounted near the rearward end of the entrance tube.

A small electrical motor 42 (FIG. 1) is mounted in the grip portion 4 and is drivingly connected through reduction gears (not shown) to the drive wheel 22. The drive wheel 22 is mounted on a spool 44 which has a bore 46 for receiving the free end of a drive rod 48 which is rotated by the motor 42. The spool 44 has recesses 50 which are normal to the bore 46 and which receive a drive pin 52 mounted in the drive rod 48. Thus, rotation of the drive rod 48 by the motor 42 causes rotation of the spool 44 and also the drive feed wheel 22. Also driven by the motor 42 is a cooling fan or blower 54 which, upon operation of the motor 42, provides forced draft cooling of the motor, the grip, that portion of the thermoplastic rod which is located in the frame, and also the entrance tube and cooling discs.

A spring biased trigger 56 is pivotally mounted on the grip portion by a mounting pin 58. A linkage 60 interconnects the trigger 56 and the valve 18 so that a pulling back of the trigger (moving the trigger to the right or clockwise as viewed in FIG. 1) influences the linkage 60 to open the valve 18, thereby clearing the channel 16 for flow of fluid thermoplastic. The valve 18 comprises an insert 62 (FIGS. 3 and 4) in the barrel 8, the insert having a bore 16' in alignment with the channel 16 and the barrel 8. A cylinder 64 is disposed in the barrel assembly normal to and intersecting the bore 16'. A cylindrical rotary valve element 66 is retained in the cylinder 64 and has two cut-away portions 68 arranged so that in one position the valve element 66 completely blocks the bore 16', preventing flow of plastic therethrough, while a 60° turn of the valve element presents the cut-away portion 68 to the flow of plastic, allowing plastic in the barrel to flow through the bore 16' of the insert 62. An extension 70 (FIG. 3) of the valve element 66 has fixed to it an arm 72 which is connected to the linkage 60. The cylinder 64 and valve element 66 are secured in place by a retaining plate 74. A lug 76 on the cylinder 64 prevents rotation of the cylinder.

A screw 78 (FIG. 1) is mounted on the trigger 56 and is disposed so as to engage the contact 80 of a microswitch 82 located on the grip, when the trigger is urged rearwardly. A stop 84 on the frame prevents further rearward movement of the trigger 56 immediately after the screw 78 engages the contact 80. When the screw 78 and contact 80 are in abutting relationship the microswitch 82 closes a circuit (not shown) which energizes the motor 42 causing operation of the drive feed wheel 22 and the forced draft blower 54.

A flange 86 having a hole 88 therein may be fixed to the frame or cover to facilitate hanging the gun on a hook or dowel when it is not being used.

As an additional feature of the present invention, an adjustable thermostat may be utilized, thereby offering a range of heat output of the heating element and making the extruder suitable for several different kinds of thermoplastic cements, each having different melt temperatures. If an adjustable thermostat is used, the device may be provided with an adjusting screw 90 for setting the barrel temperature desired. Also, there may be provided in the barrel assembly a bore 92 for receiving a thermometer. In this instance, when it is desired to change the temperature setting in order to accommodate a different type thermoplastic, the operator adjusts the screw 90 and after a few minutes wait inserts a thermometer in the bore 92 to obtain a reading of the barrel assembly temperature. Thereafter fine adjustments may be made to establish the barrel temperature at precisely that desired.

As a further additional feature of the present invention, there may be arranged in the barrel a fluted needle member 94 which divides the thermoplastic into smaller streams, diminishing the distance heat must penetrate in order to reach all of the thermoplastic. In such instance it may be preferable to provide an enlarged portion 8' of the barrel for retaining the needle 94.

In operation the device is held in an operator's hand with the palm and fingers of the hand disposed about the grip portion 4. Prior to use an electrical lead 96 is inserted into any convenient power source. The heating element 10 is thereby energized and begins to warm up the barrel 8. A thermoplastic rod T is then inserted in the feed tube 20 and pushed by hand into the barrel entrance tube 38. The device is held by the grip portion as described above, with the forefinger of the operator's hand resting upon the trigger 56. When cement is desired, the operator presses the trigger 56 causing it to move into the grip portion. As the trigger starts rearwardly the valve 18 is caused to open by the linkage 60 interconnecting the valve and the trigger. Thus, by the time the trigger reaches its full rearward position as shown in phantom in FIG. 1, the valve 18 is fully open. Rearward movement of the trigger causes engagement of the screw 78 with the contact 80 which energizes the motor 42. The motor 42 causes rotation of the driving feed wheel 22 and the forced draft blower 54. The teeth 26 of the feed wheel 22 cause the thermoplastic rod T to be moved toward the barrel entrance tube. The wheel 24 merely idles on the other side of the rod T and provides a spring biased backing for the rod T acted upon by the teeth 26 of the wheel 22. The guide plate 36 insures that the rod T is properly directed toward the barrel entrance tube 38. The forced draft blower 54 circulates air through the grip portion 4 and the frame 2 affording cooling means for the motor and also for the grip so that it does not become unduly warm in the hand of the operator. In addition, the passing of cooling air over the thermoplastic rod T prior to its entering the barrel entrance tube and the forcing of air about the entrance tube and cooling fins has a stabilizing influence on the rod T causing it to enter the barrel in a completely solid state, alleviating drippage in the frame or clogging at the barrel entrance. Air circulating holes 98 (FIG. 2) may be provided in the frame and grip portions to facilitate the circulation of cool air.

Having thus described my invention, what I claim as new and desire to secure by Letters Patent of the United States is:

1. A thermoplastic cement extruder comprising a frame, a barrel member attached to said frame for receiving thermoplastic material in solid rod form at a first end thereof, said frame having a passage for the rod of thermoplastic material aligned with said barrel member, means for heating said barrel member for melting the thermoplastic therein, a nozzle at a second end of said barrel member through which molten thermoplastic material may be discharged, a grip for manipulating the device during use, a trigger connected to said grip and adapted to be moved by an operator's finger, feed means arranged in said frame for feeding the thermoplastic rod to first end of the barrel member, power means in said grip responsive to the movement of said trigger for operating said feed means, and cooling means operable by said power means for cooling the first end of the barrel member and for cooling the thermoplastic rod prior to its entrance into said barrel.

2. A thermoplastic cement extruder comprising a frame, a barrel member attached to said frame for receiving thermoplastic material in solid rod form at a first end thereof, cooling fins mounted on the first end of said barrel, said frame having a passage for the rod of thermoplastic material aligned with said barrel member, means for heating said barrel member for melting the thermoplastic therein, a nozzle at a second end of said barrel member through which molten thermoplastic material may be discharged, a grip for manipulating the device during use, a trigger connected to said grip and adapted to be moved by an operator's finger, feed means arranged in said frame for feeding the thermoplastic rod to the first end of the barrel member, power means in said grip responsive to the movement of said trigger for operating said feed means, and a forced draft cooling means operable by said power means for cooling the thermoplastic rod prior to its entry into the barrel and for cooling said cooling fins and first end of said barrel and for cooling the power means and the grip.

3. A thermoplastic cement extruder comprising a frame, a barrel member attached to said frame for receiving thermoplastic material in solid rod form at one end thereof, said frame having a passage for a rod of thermoplastic material aligned with said barrel member, means for heating said barrel member for melting the thermoplastic therein, a nozzle at the other end of said barrel member through which molten thermoplastic material may be discharged, a valve disposed in the nozzle end of said barrel member, a grip for manipulating the device during use, a trigger connected to said grip and adapted to be moved by an operator's finger, a feed wheel arranged in said frame for feeding the thermoplastic rod through said passage, power means in said grip responsive to the movement of said trigger for operating said feed wheel, and linkage means interconnecting said valve and said trigger for opening and closing movements of said valve responsive to the movements of the trigger.

4. A thermoplastic cement extruder comprising a frame, a barrel member attached to said frame for receiving thermoplastic material in solid rod form at one end thereof, said frame having a passage for a rod of thermoplastic material aligned with said barrel member, means for heating said barrel member for melting the thermoplastic therein, a nozzle at the other end of said barrel member through which molten thermoplastic material may be discharged, a valve disposed in the nozzle end of said barrel member, a grip for manipulating the device during use, a trigger connected to said grip and adapted to be moved by an operator's finger, a feed wheel arranged in said frame for feeding the thermoplastic rod through said passage, power means in said grip responsive to the movement of said trigger for operating said feed wheel, linkage means interconnecting said valve and said trigger for opening and closing movements of said valve responsive to the movements of the trigger, and means in said grip operable by said power means for forcing air around the power means thereby to cool said power means and the grip and through the interior of said grip around said passage thereby to cool the thermoplastic rod in said message.

References Cited by the Examiner
UNITED STATES PATENTS

| | | | |
|---|---|---|---|
| 2,607,061 | 8/1952 | Leahy et al. | 222—146 X |
| 2,681,685 | 6/1954 | Arkless | 219—227 |
| 2,995,159 | 8/1961 | Berggren | 222—146 X |
| 3,203,096 | 8/1965 | Beisheim et al. | 310—50 X |

ROBERT B. REEVES, *Primary Examiner.*

F. R. HANDREN, *Assistant Examiner.*